United States Patent

[11] 3,528,333

| [72] | Inventor | Helmut Hornung<br>Scarsdale, New York |
|---|---|---|
| [21] | Appl. No. | 687,793 |
| [22] | Filed | Dec. 4, 1967 |
| [45] | Patented | Sept. 15, 1970 |
| [73] | Assignee | F.L. Smithe Machine Company, Inc.<br>Duncansville, Pennsylvania<br>a corporation of New York |

[54] DIE CUTTER
1 Claim, 5 Drawing Figs.

[52] U.S. Cl. ..................................................... 83/341,
   83/39 (or disclosure), 83/345, 83/595
[51] Int. Cl. ............................................... B26d 1/56
[50] Field of Search ................................... 83/911,
   341, 342, 345, 594, 595, 596

[56] References Cited
UNITED STATES PATENTS

| 2,568,333 | 9/1951 | Henschker et al. ............ | 83/341 |
| 3,106,121 | 10/1963 | Novick ......................... | 83/341X |
| 3,143,022 | 8/1964 | Andersen ..................... | 83/341 |

FOREIGN PATENTS

| 670,171 | 5/1936 | Germany.................... | 83/341 |

Primary Examiner—Andrew R. Juhasz
Assistant Examiner—James F. Coan
Attorney—Nolte and Nolte ABSTRACT: An improved shear cutting operation is provided by mounting cooperating male and female die means on rotary shafts extending substantially transversely to the direction of feed of the material to be cut. The die means, having continuous, cooperating cutting edges are arranged to rotate about converging axes such that contact between the die means starts at the juncture of the leading cutting edge that is linear and one of the side cutting edges that is arcuate and continues, as the shafts rotate, in opposite directions along the cutting edges to terminate at the juncture of the trailing cutting edge which is also linear and the opposite side cutting edge which is also arcuate.

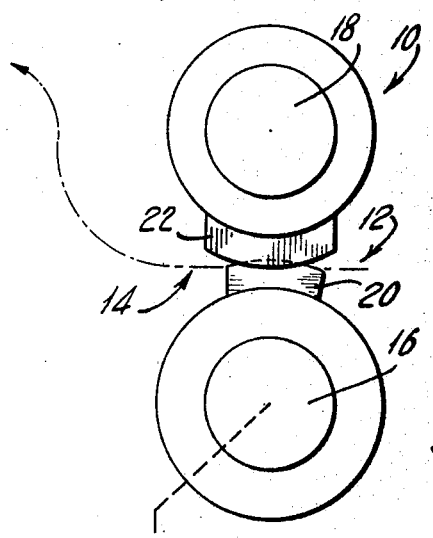
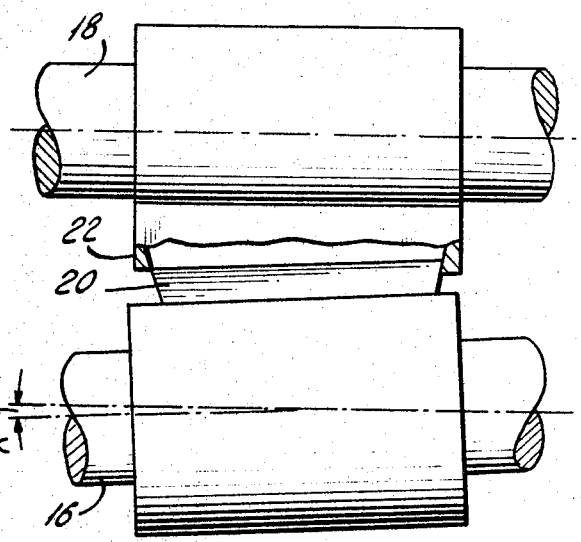
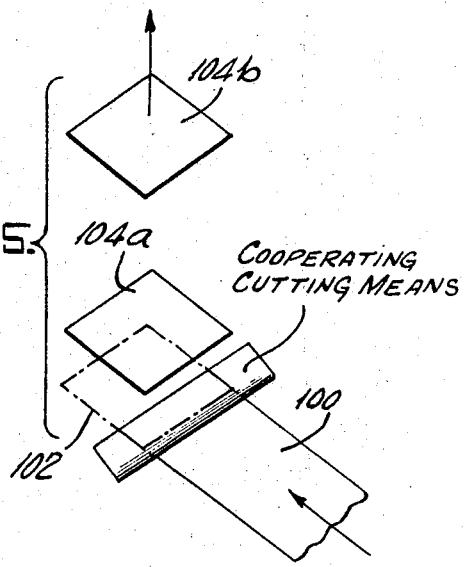
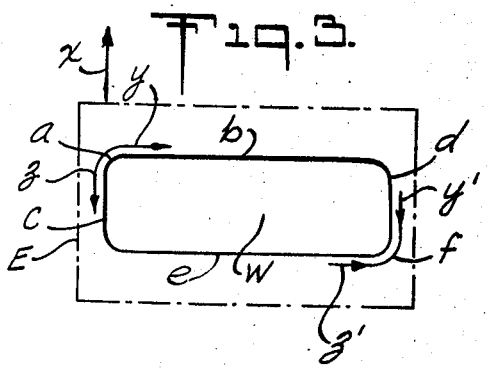

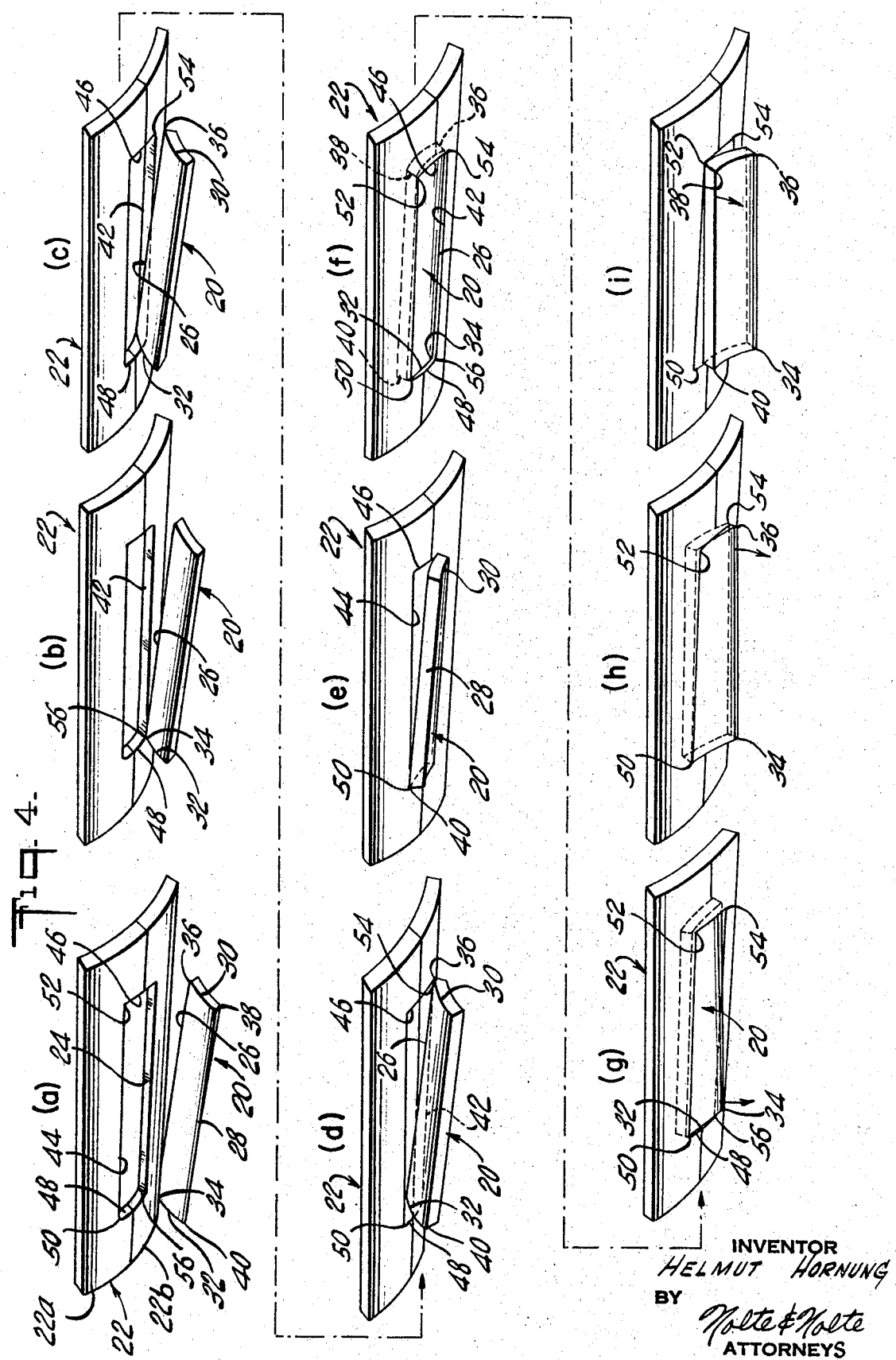

DIE CUTTER

This invention relates generally to die cutting means and in particular to cooperating male and female cutting dies that rotate about converging axes to provide an improved shear cutting operation.

In the art relating to high speed machinery for the manufacture of envelopes, it has been found that shear cutting of the blanks for example where windows are to be formed therein, provides a superior product and is more efficient for the high rates of production that are required today. The present invention will be described, by way of illustration only, with respect to the step in the manufacture of envelopes that requires the window to be cut out of the blank. However, it is not intended that the present invention be limited either to this production step or even to the manufacture of envelopes since the novel structure to be described herein after may find application during other steps in the manufacture of envelopes as well as in regard to other products.

There are many examples of rotary shear cutting devices presently available in the art. One recent development is disclosed in U.S. Pat. No. 3,143,022 issued on August 4, 1964 to Egil A. Andersen. In this patent, structure is provided for shear cutting the window openings in envelopes. Male and female dies at least one of which is contoured are mounted on parallel, rotary shafts that are positioned transversely to the direction of movement of the web of paper or the envelope blank. In the illustrated embodiments, the leading cutting edge of the female die is shaped convexly and the trailing cutting edge of the female die is shaped concavely. The intermediate side edges that inter-connect the trailing and leading edges are both arcuate. The cooperating male die is provided with a trailing edge that has a greater radial dimension than the leading edge thereof and there are interconnecting side edges of the male die that are also arcuate. The relationship of the cutting edges of the male and female dies is such that there is an overlap in all cutting positions.

When the two shafts are rotated, initial contact is made between the male and female dies at the midpoint of the leading edges thereof. The shear cutting operation starts at this point and extends outwardly, that is transversely to the movement of the envelope blank or web of paper, and simultaneously in the directions toward both the side cutting edges as the shafts are rotated. When contact is made between the side cutting edges of the male and female dies, the shear cutting operation is effected by the arcuate shape of the side cutting edges. Continued rotation of the shafts causes the trailing edges of the cooperating dies to come in contact with each other starting at their junctures with the side cutting edges and continues until the midpoint of the trailing edges are in contact with each other. This completes the rectangular cutout of the window from the blank by the prior art structure mentioned above.

The aforementioned structure is just one example of many devices in the prior art that provide a shear cutting action. While the patented structure and much of the prior art was effective for their designed purpose, it is apparent that still other advances can be made. The present invention provides at least one such advance. The relatively expensive contoured cutting dies described in the Andersen patent need no longer be used when the present invention is practiced.

As in the prior art, the present invention utilizes cooperating male and female cutting dies. They are each mounted on their own rotating shaft such that the dies rotate about converging axes. The non-parallelism of the axes of rotation of two cooperating dies permits the use of linear leading and trailing edges on the dies while still providing the shearing action that was hitherto achieved by the contoured edges. Interconnecting the leading and trailing cutting edges of the dies are arcuate side cutting edges. Thus, as will be described more fully hereinafter, the shear cutting operation of the present invention starts at one corner that is defined by the juncture of the leading cutting edge and one side cutting edge for each of the two dies. This shear cut then progresses concurrently along the leading edge and the first side edge while the shafts are being rotated. That is, there is concurrent shear cutting both parallel and perpendicular to the movement of the article being cut. Further rotation of the shafts causes the shearing action to continue as originally directed until it terminates at the juncture of the trailing cutting edge and the second side cutting edge.

By way of illustration only, the present invention will be described with male and female cutting dies rigidly mounted on non-parallel, converging, rotatable shafts. The paper web or the envelope blank is set in motion along a path that is a tangent common to both the circles generated by the cutting edges of the dies. Means well known in the art are included for providing clearances between the cooperating portions of the dies to permit rapid separation of the dies while they are rotated. There may also be provided means to remove the material that is cut from either the paper or the blank.

Accordingly, it is an object of this invention to provide an improved shear cutting apparatus and method that is operable on a moving web or blank.

It is another object of this invention to provide shear cutting apparatus defined by an improved form of cooperating male and female cutting dies.

It is still another object of this invention to provide the aforesaid improved shear cutting apparatus that is mounted for rotation about non-parallel axes.

A further object of this invention is to provide improved apparatus for and a method of shear cutting envelope blanks whereby the cutting action takes place concurrently in directions that are parallel and perpendicular to the path of the article being cut.

Still another object is to provide in the aforementioned apparatus, dies having linear leading and trailing cutting edges.

It is a particular object of this invention to provide improved apparatus comprising cooperating, shear cutting male and female dies mounted on two non-parallel, rotary shafts.

These and other objects, features and advantages of the invention will, in part, be pointed out in particularity and will, in part, become obvious from the following more detailed description of the invention, taken in conjunction with the accompanying drawing, which forms an integral part thereof.

In the various figures of the drawing like reference characters designate like parts.

In the drawing:

FIG. 1 is a fragmentary, schematic side elevational view of the window cutting station of an envelope making machine;

FIG. 2 is a fragmentary elevational view, partly in section, illustrating the relationship of the male and female dies and their respective rotary support means;

FIG. 3 is a schematic plan view illustrating the cut made by the dies as well as the starting and the terminating portions of the cut;

FIG. 4 schematically illustrates the step-by-step relationship of the cutting dies during a single cycle; and FIG. 5 schematically illustrates a type of cut, other than a window opening, that may be effected by the structure of this invention.

As mentioned above, the present invention will be described particularly with regard to the window cutting section of an envelope making machine, although it is to be understood that the invention need not be limited either to that section or, in fact, to an envelope making machine. In FIG. 1 the window cutting section is generally designated by the reference character 10 and includes an input side 12 and output side 14. The input and output means may conveniently take the form of driven, cooperating rollers (not shown), the construction and the relationship of which are well known in the art and need not be described or illustrated. Further, the operations performed on the material, which moves in the direction shown by the arrow and the dot-dash line, either before or after the window cutting section, form no part of the present invention and will not be discussed in detail.

The window cutting section of the apparatus is shown schematically in FIGS. 1 and 2 and includes transverse shafts 16 and 18 which are journalled in the side frames of the machine on suitable bearings, neither of which elements are illustrated. The male cutting die 20 is secured by suitable fasteners to the shaft 16 and the female die 22 is similarly secured to shaft 18. The female die is conveniently formed in two sections, 22a and 22b, (FIG. 4) for purposes of simplifying the removal and sharpening thereof. This too forms no part of the present invention. Drive means 24 are also shown schematically in FIG. 1 to illustrate that any suitable means may be used to concurrently rotate the two die support shafts.

To simplify the description of this invention, the male cutting die 20 is shown as having linear leading and trailing cutting edges 26 and 28 respectively connected by arcuate side cutting edges 30 and 32. The junctures between adjacent cutting edges are designated 34, 36, 38 and 40.

Similarly, for purposes of description, the female cutting die 22 is defined by linear leading and trailing cutting edges 42 and 44 respectively connected by arcuate side cutting edges 46 and 48. The junctures of the cutting edges of the female die are designated 50, 52, 54 and 56.

It should be particularly noted that the leading and trailing edges of the male and female dies are linear and that they are neither convex nor concave. The side cutting edges of the male and female cutting dies are arcuate. It should be further noted that the axes about which the male and female dies rotate converge. This is accomplished, in the embodiment illustrated by making the shafts on which the dies are mounted non-parallel. As shown best in FIG. 2, shafts 16 and 18 are not parallel to each other by dimension $\alpha$.

FIG. 3 represents the window W cut into the envelope E by the structure and method of this invention. Assuming that the article to be cut is travelling through the machine in the direction indicated by the arrow $x$ and the axes of the cutting dies converge in the manner shown in FIG. 2, then the initial contact between the dies will take place at point $a$. When the die support shafts are rotated in the directions shown in FIG. 1, the shear cutting action will commence concurrently in the directions indicated by the arrows $y$ and $z$. These directions are substantially perpendicular and parallel to the $x$ direction and, as noted above, the cuts that define edges $b$ and $c$ occur simultaneously. After the shafts have rotated sufficiently the shearing cuts will take place simultaneously along edges $d$ and $e$, proceeding in the directions denoted by arrows $y'$ and $z'$ so that the shear cutting operation terminates at point $f$. The cuts along edges $d$ and $e$ are also made substantially perpendicular and parallel to the $x$ direction and take place concurrently. Although several cuts and points are described for convenience as being separate, it is intended that the operation is a continuous one.

Referring now to FIG. 4 it will be seen that the first contact between the male and female dies takes place substantially at the junctions 34 and 56 between edges 26 and 32 of the male die 20 and edges 42 and 48 of the female die 22 respectively. In the interest of clarity, for the reminder of the discussion of steps $a$—$i$ of FIG. 4, the drawings will show that female die is stationary and that the male die rotates about an axis that is not parallel to the axis of the female die. In reality however, both dies rotate about converging axes.

As shafts 16 and 18, carrying dies 20 and 22 continue to rotate in the direction shown by arrows in FIG. 1, it will be appreciated that the line of contact between the cooperating edges of the male and female dies extends in the direction away from junctures 34 and 56. Once the cutting action has been initiated at junctures 34 and 56, the cutting action continues concurrently along leading edges 26 and 42 of the male and female dies, respectively, and side cutting edges 32 and 48 of the male and female cutting dies respectively. Continued rotation of shafts 16 and 18 causes the cutting action to continue along the male leading and side cutting edges 26 and 32 and the female leading and side cutting edges 42 and 48. Ultimately the shearing cutting action will continue along the other side cutting edges 30 and 46 concurrently with cutting action along trailing edges 28 and 40 so that the termination of the cut occurs at the junctures 38 and 52.

The foregoing description applies to the shearing action initiated at the junctures 34 and 56 and terminating at junctures 38 and 52 as illustrated by step $a$—$f$ in FIG. 4. Continued rotation of the shafts 16 and 18 will result in a continuation of the rotation of the dies. Thus juncture 34 will separate first from juncture 56 and then the cutting edges will progressively separate starting with edges 26, 42 and 32, 48. Finally, after edges 28, 44 and 30, 46 separate, junctures 38 and 52 will separate as shown in steps $g$—$i$ in FIG. 4.

The present invention utilizes means well-known in the art for (a) discharging the material resulting from the cutting action, (b) assuring a quick separation of the male and female dies, i.e. a suitable shim positioned beneath the male cutting die and (c) providing clearances about the male and female cutting dies so as not to interfere with the shear cutting operation.

The present invention distinguishes over the prior art, and particularly by U.S. Pat. No. 3,143,022, by virtue of the fact that leading and trailing edges of the male and female dies are linear as opposed to being shaped in the form of convex or concave cutting surfaces. Further, the present invention produces cuts simultaneously in directions that are parallel and perpendicular to the direction of movement of the article whereas the patented structure mentioned above first cuts perpendicularly then parallel and then perpendicularly to the direction of movement of the article. The present invention provides initial contact of a male and female cutting dies at the juncture of the leading and side edges thereof, primarily by rotating the male and female dies about axes that are convergent. A substantial reduction in the cost of producing the dies is thereby achieved.

While the initial contact between the male and female die members has been described as the juncture between the leading and side edges of the respective die members, it should be understood that this juncture need not necessarily be considered only as a point but may also be considered as a very short segment. The primary feature of this invention, as opposed to the prior art, is that the initial contact and therefore the initial shear cutting starts at a juncture or along a very small length substantially at the point where the leading and side edges are joined.

Where the side cutting edges are referred to as being curved it is meant that the radius of curvature is substantially concentric with the longitudinal axis of the respective shafts. As far as the side cutting edges are concerned these arcuate members by themselves provide progressive cutting action.

While the present invention has been described in conjunction with the cutting out of windows from envelopes, either in blank form or in the form of a continuous web it should be clearly understood that the invention is not limited thereto. For example, instead of providing a rectangular cut-out, suitably constructed cutting means incorporating the concepts of this invention may provide either a partial or a full shear cut transverse the movement of the web or blank. This may be done to sever a blank from a moving web or to remove a small portion from either or both the seal flap or bottom flap of the blank. Further the present invention, by suitably constructing the cutting means, may be used to form the corner notches that are conventionally provided in the envelope blank. In the latter situation each notch is formed by two intersecting cuts, one of which is substantially parallel and one of which is substantially perpendicular to the direction of movement of the blank or web. The notches of course may take other convenient shapes, the above description being given for purposes of illustration only.

With regard to the transverse type cut mentioned above, reference may be had to FIG. 5 wherein there is shown a web of material being fed in the direction of the arrow to cutting means constructed in accordance with this invention. The method and apparatus for feeding the web both prior to and subsequent to cutting is fully disclosed in U.S. Pat. Nos. 2,951,408 and 3,056,322 both issued to Abraham Novick. By placing the cooperating cutting means of this invention in the same relationship to web feed as shown in the issued patents a rhombic blank is formed. For purposes of this description the web in FIG. 5 is designated by the reference character 100, the last severed blank is labeled 102 and the previously cut blanks, that are being moved away in the direction of the arrow by structure, not illustrated, are labeled 104a, 104b, etc.

Although not specifically illustrated, it is contemplated that the scope of this invention includes a first member having a cutting edge that is rotated about an axis not parallel to an axis transverse the movement of the web or blank. The first member coacts with a second member, either stationary or rotary so that the material passing there between is shear cut in one of the forms hereinbefore described. Similarly, while means to couple the die supporting shafts are not shown it is to be understood that they may be meshing gears, as is conventional in the art.

The non-parallelism of the axis of rotation of the male and female dies assures that a shear cutting action will be performed. While the non-parallelism, has been shown as being provided by non-parallel shafts, the invention should not be construed as being limited to this construction. Other means may be utilized to achieve the non-parallelism relationship to provide the shear cutting action with linear cutting edges. Accordingly, it is not necessary to incur the additional expense of accurately shaping the male and female dies (concavely and convexly) as was necessary in the prior art. Although it is not specifically illustrated it is to be clearly understood that conventional means may be used to remove the rectangular area of the web or blank that is cut by the male and female dies. Suitable timing mechanisms control both the cutting action and the removal of the rectangular areas.

There has been disclosed heretofore the best embodiment of the invention presently contemplated. It is to be understood however that various changes and modifications may be made by those skilled in the art without departing from the spirit of the invention.

I claim:

1. An improved shear cutting mechanism for use on an article traveling through an envelope-making machine or the like, said cutting mechanism comprising cooperating male and female cutting dies, one of said dies having a first set of cutting edges while the other of said dies having a second set of cutting edges positioned in coacting intersecting relationship with said first cutting edges to provide a shear cutting action on the article when the article travels therebetween, and means mounting said dies for rotation about non-parallel axes, the first and second cutting edges both constituting spaced, opposed linear leading and trailing edges, and spaced opposed arcuate side cutting edges, said axes upon which said dies rotate being converging whereby said shear cutting action on said article commences in substantially perpendicular directions at the junction of a leading edge and an adjacent side edge, each of said cutting edges being radially equidistant from the respective axes about which they rotate, the cutting action of said dies on said article being initiated at the intersection of the cutting edge portions in substantially perpendicular directions and terminated at a location diagonally opposite to the point of initiation of said cutting action.